US012699901B2

(12) United States Patent
Timm et al.

(10) Patent No.: US 12,699,901 B2
(45) Date of Patent: Aug. 4, 2026

(54) FAST QUANTISED TRAINING OF TRAINABLE MODULES

(71) Applicant: Robert Bosch GmbH, Stuttgart (DE)

(72) Inventors: Fabian Timm, Renningen (DE); Lukas Enderich, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1172 days.

(21) Appl. No.: 17/632,735

(22) PCT Filed: Aug. 6, 2020

(86) PCT No.: PCT/EP2020/072158
§ 371 (c)(1),
(2) Date: Feb. 3, 2022

(87) PCT Pub. No.: WO2021/052677
PCT Pub. Date: Mar. 25, 2021

(65) Prior Publication Data
US 2022/0277200 A1     Sep. 1, 2022

(30) Foreign Application Priority Data

Sep. 19, 2019     (DE) ..................... 10 2019 214 308.3

(51) Int. Cl.
*G06N 3/082*          (2023.01)
(52) U.S. Cl.
CPC ................................... *G06N 3/082* (2013.01)
(58) Field of Classification Search
CPC .......... G06N 3/082; G06N 3/045; G06N 3/08; G06N 3/063
See application file for complete search history.

(56) References Cited

U.S. PATENT DOCUMENTS 11,157,793 B2 *   10/2021   Lazaro-Gredilla ...... G06N 7/01
11,429,862 B2 *   8/2022   Chai .................... G06N 3/0495
(Continued)

FOREIGN PATENT DOCUMENTS

| JP | 2019032833 A | 2/2019 |
| WO | 2018158043 A1 | 9/2018 |
| WO | 2019157251 A1 | 8/2019 |

OTHER PUBLICATIONS

Courbariaux et al. ("BinaryConnect: Training Deep Neural Networks with binary weights during propagations", 2015) (Year: 2015).*

(Continued)

*Primary Examiner* — Imad Kassim
(74) *Attorney, Agent, or Firm* — NORTON ROSE FULBRIGHT US LLP

(57) ABSTRACT

A method for training a trainable module that maps input variables onto output variables through an internal processing chain. A learning data set is provided including learning values of the input variables and associated learning values of the output variables. A list of discrete values is provided from which the parameters characterizing the internal processing chain are to be selected, the discrete values being selected such that they can be stored without loss of quality. The learning values are mapped by the trainable module onto assessment values of the output variables. A cost function is evaluated that characterizes deviations of the assessment values of the output variables from the learning values and of at least one parameter of the internal processing chain from at least one discrete value in the list. At least one parameter of the internal processing chain is adjusted to improve the value of the cost function.

19 Claims, 8 Drawing Sheets

(56)     References Cited

U.S. PATENT DOCUMENTS

| | | | |
|---|---|---|---|
| 2017/0286830 A1* | 10/2017 | El-Yaniv | G06N 3/045 |
| 2018/0107926 A1* | 4/2018 | Choi | G06F 7/582 |
| 2020/0202213 A1* | 6/2020 | Darvish Rouhani | G06N 3/0442 |
| 2020/0202218 A1* | 6/2020 | Csefalvay | G06Q 20/3672 |
| 2020/0302289 A1* | 9/2020 | Ren | G06N 3/084 |
| 2022/0076124 A1* | 3/2022 | Timm | G06N 3/09 |

OTHER PUBLICATIONS

Hubara et al. ("Quantized Neural Networks: Training Neural Networks with Low Precision Weights and Activations", Journal of Machine Learning Research 18 (2018) 1-30) (Year: 2018).*

Ajanthan et al. ("Proximal Mean-field for Neural Network Quantization", 2019 ICCV, pp. 4871-4880) (Year: 2019).*

Jung et al. ("Learning to Quantize Deep Networks by Optimizing Quantization Intervals with Task Loss", 2019 ICCV, pp. 4350-4359) (Year: 2019).*

Zhou et al. ("Incremental Network Quantization: Towards Lossless Cnns With Low-Precision Weights", 2017 ICLR) (Year: 2017).*

Krishnan et al. ("Quantized Reinforcement Learning (Quarl)", 2019) (Year: 2019).*

Conti et al. ("XNOR Neural Engine: a Hardware Accelerator IP for 21.6-fJ/op Binary Neural Network Inference", vol. 37, No. 11, Nov. 2018 pp. 2940-2951) (Year: 2018).*

"Fixed-Point Arithmetic," Wikipedia, accessed Aug. 5, 2020, pp. 1-5.

Narang, et al.: "Mixed Precision Training," ICLR 2018, arXiv:1710.03740v.3, Cornell University Library, pp. 1-12.

Wess et al., "Weighted Quantization-Regularization in DNNs for Weight Memory Minimization Toward HW Implementation," IEEE Transactions on Computer-Aided Design of Integrated Circuits and Systems, 37(11), (2018), pp. 2929-2939.

International Search Report for PCT/EP2020/072158, Issued Nov. 11, 2020.

Wess et al., "Weighted Quantization-Regularization in DNNs for Weight Memory Minimization Toward HW Implementation," IEEE Transactions on Computer Aided Design of Integrated Circuits and Systems, vol. 37, No. 11, 2018, pp. 2929-2939.

Micikevicius et al., "Mixed Precision Training," Cornell University Library, 2018, pp. 1-12.

"Fixed-Point Arithmetic, " Wikipedia, 2020, pp. 1-5.

Jacob et al., "Quantization and Training of Neural Networks for Efficient Integer-Arithmetic-Only Inference," 2018 IEEE/CVF Conference on Computer Vision and Pattern Recognition, 2018, pp. 2704-2713.

* cited by examiner

200

100 train trainable
module

210

12a 3a-3c,12a carry out
implementation

220 set parameters
in arithmetic unit

230

12 arithmetic unit

6

12a

11

6

12

12a

1

13

(a)

(b)

(c)

(d)

(e)

(f)

FAST QUANTISED TRAINING OF TRAINABLE MODULES

FIELD

The present invention relates to the training of trainable modules, specifically for use in control devices for vehicles or in other embedded systems.

BACKGROUND INFORMATION

For many demanding classification and control tasks that can be completely mathematically modeled only with difficulty or not at all, trainable modules are used that contain for example neural networks. An artificial neural network, or ANN, is a processing chain that usually contains a multiplicity of layers having neurons. Each neuron combines a multiplicity of input variables having weights to form an activation. The activations formed in a layer, or a result ascertained therefrom through further processing, are respectively supplied to the next adjacent layer until the ANN has been completely run through and one or more output variables result. The ANN thus maps values of the input variables onto values of the output variables as determined by the internal processing chain.

The weights, the activations, and the results ascertained therefrom are usually floating-point numbers. In order to make it possible to efficiently carry out the required number of floating-point operations required during training and later use of the ANN, frequently graphic processors, or GPUs, are used. Typically, more GPU working memory is required here than is standardly installed in desktop GPUs.

PCT Patent Application No. WO 2018/158 043 A1 describes a method for the encoding of numerical values in an ANN, in which the highest-valued bit is specifically reserved for encoding the value zero. In this way, it can be checked particularly quickly whether the value is zero.

SUMMARY

In the context of the present invention, a method has been provided for training a trainable module. The trainable module maps one or more input variables onto one or more output variables through an internal processing chain. The internal processing chain is characterized by a set of parameters.

A trainable module is regarded in particular as a module that embodies a function, parameterized with adjustable parameters, ideally so as to have a high capacity for generalization. In the training of a trainable module, the parameters can in particular be adjusted in such a way that when learning input variables are inputted into the module, the values of associated learning output variables are reproduced as well as possible.

The internal processing chain can in particular for example include, or be, an artificial neural network ANN. The parameters can then include weights with which neurons respectively combine a plurality of input variables to form an activation.

In accordance with an example embodiment of the present invention, in the method, at least one learning data set is provided that includes learning values of the input variables and associated learning values of the output variables. Typically, in the course of the training a multiplicity of learning data sets are provided that encompass many variants of situations presented at the input side that the trainable module is intended to handle.

In accordance with an example embodiment of the present invention, a list of discrete values is provided from which the parameters characterizing the internal processing chain during the training are to be selected. These discrete values are selected such that they can be stored as a fixed-point number, with a specified number N of bits, without a loss of quality.

A discretization of the modeling parameters generally results in a reduced storage outlay of the ANN. If these discrete values can in addition be expressed in loss-free fashion as fixed-point numbers, an efficient implementation can be realized on fixed-point hardware. Such fixed-point hardware is significantly lower in cost, more energy-efficient, and saves space compared to hardware for floating-point calculations.

In accordance with an example embodiment of the present invention, the desired setting to the discrete values is now integrated into the training of the trainable module from the outset. That is, this training now takes into account equally both the desire for the learning values of the input variables to be mapped as well as possible onto the learning values of the output variables, and the desire for the parameters to assume only the discrete values.

For this purpose, the learning values, contained in the learning data set, of the input variables are mapped by the trainable module onto assessment values of the output variables. A specified cost function is now evaluated that characterizes both a deviation of the assessment values of the output variables from the learning values, contained in the learning data set, of the output variables, and a deviation of at least one parameter of the internal processing chain from at least one discrete value in the list. At least one parameter of the internal processing chain is adjusted with the aim of improving the value of the cost function. In at least one adjustment of the parameters, the value range of the parameters and/or of a gradient of the cost function is limited using the discrete values.

The cost function can be for example a sum. In this sum, the first summand can characterize the deviation of the assessment values of the output variables from the learning values, contained in the learning data set, of the output variables. The second summand can include at least one penalty variable that characterizes the deviation of the at least one parameter of the internal processing chain from the at least one discrete value in the list. The sum can optionally also be weighted. The weighting can in particular be carried out individually for each layer. Thus, for example a weighting can be used that is inversely proportional to the number of parameters of exactly this layer.

The adjustment of the at least one parameter of the internal processing chain can in particular be directed towards optimizing the value of the cost function, such as minimizing it. This optimization is then a simultaneous improvement both with respect to the optimal reproduction of the knowledge contained in the learning data sets and with respect to maintaining the desired discretization of the parameters.

For the optimization, for example a gradient descent method, or any other optimization method, can be used that, on the basis of the value of the cost function, proposes changes in one or more parameters that in the further course of the training can be expected to improve the value of the cost function. In this context, "can be expected" means that an improvement of the value of the cost function does not necessarily have to occur in each training step. In the course of the training, there can also be "missteps" that instead worsen the value of the cost function. The optimization method learns from these "missteps," so that the initial worsening is in the end reversed to form an improvement.

In accordance with an example embodiment of the present invention, the number N of bits defines the number of possible discrete values to a maximum of $2^N$. In trials by the inventors, values of N between 2 and 7, preferably between 2 and 5, quite particularly preferably between 2 and 3, have turned out to be particularly advantageous. Here, the last-named, narrowest range is counterintuitive, because, prima facie, it would be expected that this discretization will also propagate into the output variables supplied as a whole by the trainable module, thus making these significantly coarser. However, in practical applications this is not the case, because, due to the multiplicity of parameters that are provided, the trainable module continues at all times to be capable of mapping the knowledge presented in the form of learning data sets in differentiated fashion.

In the case of N=2, it can in addition be advantageous to select asymmetrical quantization or discretization, i.e., to reduce the number of discrete values to $2^N-1=3$. A scaling to $\{-1, 0, 1\}$ is then possible. In this way, only additions for calculating the activation are then further required. Because the scaling is a power of two ($2^{-f}$), the decimal point subsequently has to be shifted only by the respective scaling factor f. Overall, in this way no floating-point operations are any longer required, but rather only "favorable" additions and bit-by-bit shifts.

The number N can be used as an adjustment tool in order to adjust the training of one and the same basic architecture for a trainable module to different applications. If the basic architecture remains the same, this has the effect that the realization of the different applications on hardware can take place with a large portion of common parts, which in turn makes production simpler and lower in cost.

The list of discrete values can come from any source. It can for example be defined on the basis of prior knowledge about the application in which the trainable module is to be operated. However, it is also possible to define the list of discrete values entirely or partly automatically if such prior knowledge has gaps or is not available.

In a particularly advantageous embodiment of the present invention, the list of discrete values is ascertained on the basis of the values of the parameters, obtained during a pre-training of the trainable module, of the internal processing chain. This pre-training can in particular be carried out using floating-point numbers for the parameters, i.e. without quantization or any other limitation of the values that the parameters can assume.

In the pre-training, the learning values, contained in at least one learning data set, of the input variables are mapped by the trainable module onto assessment values of the output variables. A specified pre-training cost function is evaluated that characterizes a deviation of the assessment values of the output variables from the learning values, contained in the learning data set, of the output variables. At least one parameter of the internal processing chain is adjusted with the aim of improving, in particular optimizing, the value of the pre-training cost function.

Here, the pre-training cost function can in particular characterize for example the deviation of the assessment values of the output variables from the learning values, contained in the learning data set, of the output variables in the same way as the specified cost function described above does. That is, in the above-cited example, in which this specified cost function is a sum, the summand that characterizes the deviation of the assessment values of the output variables from the learning values, contained in the learning data set, of the output variables can for example be taken over unmodified as the pre-training cost function.

However, this is not necessarily required, because in the context of the pre-training only a rough indication is to be obtained of the value range in which the parameters lie. For example, a modification of the stated summand, or also a completely different alternative pre-training cost function, may be used, for example because such an alternative pre-training cost function can be evaluated more quickly.

For example, a value range in which the parameters lie can be ascertained. The discrete values of the list can then be ascertained as a function of this range. They can for example be distributed in equidistant fashion in this range, and/or can be defined in this range on the basis of cluster points of the values of parameters.

Alternatively, or in combination with this, the number N of bits and/or the list of discrete values can also be adjusted during the actual training i with the aim of improving, in particular optimizing, the value of the cost function. This adjustment can thus be integrated into the normal training of the trainable module. If the cost function is a function both of the error that the trainable module makes in the processing of the learning values of the input variables and also of the discretization error of the parameters, then both types of errors can be causes of a poor value of the cost function. It is then consistent if the trainable module can itself learn to remove the discretization error in the same way as is done for the removal of too-large deviations from the learning values of the output variables.

In a further, particularly advantageous embodiment of the present invention, the discrete values in the list are distributed uniformly, i.e. symmetrically, around 0. That is, the values are distributed around zero with a constant distance (step width) $\Delta$, where $\Delta$ is any power of two.

Discrete values of this type are distinguished in that arithmetic operations with these values can be implemented particularly easily on fixed-point hardware. A scaling by the step width $\Delta$ can easily be implemented as a simple bit-by-bit shift operation.

For example, the discrete values in the list can be whole-number values. Then, in particular for example discrete values that are numerically adjacent can each differ by a step width $\Delta$ that is a power of two of a non-negative whole number.

In the course of the training, the parameters are typically adjusted successively in many update steps, in order finally to reach a set of parameters for which the value of the cost function is optimal. In a particularly advantageous embodiment of the present invention, in at least one adjustment of the parameters values of the parameters that are lower than the lowest discrete value of the list are set to this lowest discrete value, and/or values of the parameters that are higher than the highest discrete value of the list are set to this highest value. It has been found that in this way, surprisingly, the training converges to a still better result, and moreover that it converges significantly faster.

A cause of this is that, during the training and also in the end result, values of the parameters outside the interval between the lowest discrete value of the list and the highest discrete value of the list can result in an artificial preference for the lowest and the highest value of the list. Thus, for example the training, from the point of view that the assessment values of the output variables should be as consistent as possible with the learning values of the output variables, may produce values of the parameters that lie far outside the interval. This may then "nail down" the parameters to the lowest or highest value of the list. In this way, in a similar manner a part of the information processed in the training may be lost, as in the overloading of an image sensor that can no longer distinguish very high brightness values from one another, and instead then always outputs only its maximum saturation value. This tendency is counteracted by setting parameters outside the permitted interval to the corresponding interval limits. This can in particular advantageously be done during each adjustment of the parameters in the course of the training. Overall, significantly fewer training epochs are then required to train the ANN in such a way that the trained ANN achieves a specified degree of accuracy in a test with validation data.

This effect is reinforced by the fact that the parameters are typically still changing strongly in particular at the beginning of the training. Thus, for example in one training epoch a parameter can have a negative value that can change to a positive value in a later training epoch. If, for example, the permitted discrete values for a parameter are $-1$, $0$, and $1$, and the parameters were set to $-10$ in the first training epoch, while in a later training epoch the tendency goes in the direction of $+2$, then the strong negative excursion at $-10$ in connection with the discretization can have the result that the trend reversal is completely "damped away." This is prevented if the negative excursion at $-1$ is cut out.

The limiting of the parameters to the permitted interval during the training has the further effect that less computing time is applied for the calculation of intermediate results that are not reflected at all in the parameters ascertained as the final result of the training. If the permitted discrete values for a parameter are for example $-1$, $0$, and $+1$, then it is of no use to optimize this parameter, in a plurality of steps, to $-3$, then to $-3.141$, and finally to $-3.14159$. The early limiting of the parameters limits the search space from the outset to the one that is finally sought. In a certain way, the effect is comparable with the fact that passwords can be cracked significantly faster if an originally very large search space (such as 15 characters from the complete set of available characters) can be limited using prior knowledge about the poor habits of the user, for example limited to "six lowercase letters." Here, the solution space is given by the list of the discrete values that the parameters can assume after the training. Therefore, it would be inefficient not to use this solution space during the training.

In trials by the inventors, the combination of the saving of training epochs and the saving of computing outlay within each epoch succeeded in reducing the overall computing time required for the training by up to 70%.

A further particularly advantageous embodiment of the present invention goes in the same direction. Here, during at least one adjustment of the parameters a gradient of the cost function expressed in the parameters as variables is ascertained, the gradient going in the direction towards better values of the cost function. The parameters are modified by a product of the gradient and a step width (gradient descent or gradient ascent method). As important innovations, during the ascertaining of the gradient components of the gradient that relate to parameters that currently have the lowest discrete value in the list are limited to non-negative values, and/or components of the gradient that relate to parameters that currently have the highest discrete value of the list are limited to non-positive values.

In particular, algorithms for calculating components of the gradient can be halted already at the point at which it becomes apparent that they have the unwanted sign. In the named example, in which only the discrete values $-1$, $0$, and $+1$ are permitted for a parameter, starting from the value $-1$ it is clear from the outset that only a change in the positive direction of this parameter is possible. If the gradient relating to this parameter points in a negative direction, then this modification cannot be carried out, and it is then also senseless to make this change more precise by going, in a plurality of steps, to $-2.7$, then to $-2.718$, and finally to $-2.71828$. In a certain way, the situation is analogous to oral examinations in which the testing rules specify a minimum duration and a maximum duration. If the "deficiency" is apparent as soon as the minimum duration has passed, the test is ended and the "deficiency" is posted. In contrast, the highest duration is used to bring out the nuances between "very good" and "with distinction."

In a further particularly advantageous embodiment of the present invention, the cost function contains a weighted sum of a first contribution that characterizes a deviation of the assessment values of the output variables from the learning values, contained in the learning data set, of the output variables, and a second contribution that characterizes a deviation of at least one parameter of the internal processing chain from at least one discrete value in the list.

As the training progresses, the weighting of the first contribution is reduced, and the weighting of the second contribution is increased. In particular, for example the speed or rate with which this change of the weighting is carried out can increase exponentially as the training progresses.

It has been found that the discretization of the values of the parameters, as well as in addition other regularizations of the parameters, greatly reduces the so-called modeling capacity of the ANN. The modeling capacity is a function of the number of possible combinations of values of the parameters, and is therefore a measure of the dimensionality of a space spanned by the parameters.

The greater the modeling capacity is, the more nuances can be processed during the training of the ANN with respect to a reproduction that is as good as possible of the learning output variables, and the better will be the accuracy achieved after the conclusion of the training. A too-high modeling capacity can however give the training a tendency towards overfitting, which is essentially a "learning by rote" of the situations represented by the training data. This knowledge "learned by rote" is poorly generalizable to new situations that were not included in the training. A limitation of the modeling capacity during the training can therefore prevent overfitting to the training data and can therefore be very appropriate, in particular in an advanced phase in which the training is being perfected, so to speak. This limitation finds its practical limit only at the point at which the ANN can no longer handle the complexity of the problem posed, due to the too-low modeling capacity.

By first beginning the training with a high modeling capacity and later steering it in the direction of an overweighting of the discretization, the final result of the training can become an appropriate combination of convergence, in the sense of the learning task, on the one hand, and discretization on the other hand. First, with the high modeling capacity the overweighting is placed on the learning task of the ANN, in order to achieve first important learning successes here as early as possible. A comparison with human learning processes illustrates that this improves the accuracy of the end result: anyone who, beginning a course of study and having a high modeling capacity, achieves the important learning successes in the foundations of the discipline, will later be able to access this knowledge whenever needed, and will end up finishing well. On the other hand, anyone who in this early phase has to struggle with a too-low modeling capacity will always lag behind.

Through the later reduction of the modeling capacity, the initial learning success is as it were "conserved," and the training becomes oriented toward the aim of discretization. Differing from a strict two-stage training, in which in the first stage the focus is exclusively on the intended application, and in the second stage the focus is exclusively on the discretization, here the respective other goal is never completely lost sight of. In this way, the training is prevented from going too strongly towards discretization, at the expense of the learning success already achieved, relative to the intended application.

In a further particularly advantageous embodiment of the present invention, each of the parameters is set to the discrete value from the list to which it is closest. This can be done once or multiple times at any point during the training and/or after the conclusion of the training. In particular through the setting, once or multiple times, to the discrete values during the training, the trainable module can learn to operate in the best possible way with the limitations that the discretization entails, and nonetheless to supply maximum accuracy.

In a further particularly advantageous embodiment of the present invention, the trainable module is validated after the setting of the parameters to the discrete values. In this way, it is checked whether the trainable module has really "understood" the knowledge contained in the learning data sets and can apply it to new situations, or whether the trainable module has only learned this knowledge "by rote" in such a way that it is prepared for exactly the known situations.

For the validation, a multiplicity of validation data sets are provided that each include validation values of the input variables and associated validation values of the output variables. Here, the set of validation data sets is not identical with the set of the learning data sets. In particular, the set of validation data sets can advantageously be disjoint from the set of the learning data sets.

For each validation data set, the respective validation values of the input variables are mapped by the trainable module onto test values of the output variables. It is tested whether the deviations of the test values from the validation values of the output variables fulfill a specified criterion. Such a criterion can be for example that a mean, for example in terms of the magnitude or the square, of the deviations over all validation data sets is below a specified threshold value. Alternatively, or in combination with this, it can for example be tested whether the maximum deviation on the set of validation data sets is below a specified threshold value. If the specified criterion is fulfilled, the trainable module can be found to be suitable for real-world use.

The setting of the parameters to the discrete values from the list before the validation has the advantage that the trainable module can in this way be tested in exactly the state in which it is later implemented on hardware. The implementation in hardware, for example hardware designed for fixed-point arithmetic, will not cause any change in the behavior of the module. This means that the validation does not have to take place on the hardware with the trainable module that is later installed in the end product, but rather can take place on faster hardware, such as a GPU, used for the development and training of the trainable module.

This may be advantageous in particular in connection with safety-critical applications, for example in connection with the controlling and monitoring of vehicles on land, on water, and in the air. Permissions for public transportation frequently require very extensive validation. This validation will not be invalidated by implementation in hardware, or by a subsequent change of hardware platform during further product development.

The cost function used for the training can for example have the form $$\tilde{L} = L + L_R$$

where L is a portion that characterizes only the deviation of the assessment values of the output variables from the learning values, contained in the learning data set, of the output variables, and where $L_R$ is a portion that characterizes only the deviation of at least one parameter of the internal processing chain from at least one discrete value in the list.

If the internal processing chain of the trainable module includes for example a neural network, ANN, made up of L layers, and each layer includes a number $M^{(l)}$ of weights that is a function of the index l of the layer, then the parameters to be discretized can for example include all the weights $$w_i^{(l)}.$$

The portion $L_R$ of the cost function can then for example have the form $$L_R = \sum_{l=1}^{L} \sum_{i=1}^{M^{(l)}} \frac{\lambda}{M^{(l)}} \left( w_i^{(l)} - w_{i,q}^{(l)} \right)^2 \tag{1}$$

where the index q in the subtrahend designates the respectively adjacent discrete value of the corresponding weight. The parameter $\lambda$ determines how strongly the portion $L_R$ is weighted relative to the portion L. In this way, it can in particular be used, as described above, as an adjustment tool between the learning task and the discretization. As explained above, $\lambda$ can be varied during the training, and in particular can for example increase exponentially as the training progress increases.

Partial differentiation of this expression according to the weights yields:

$$\frac{\partial L_R}{\partial w_i^{(l)}} =$$

$$\frac{\lambda}{M^{(l)}} \left( w_i^{(l)} - w_{i,q}^{(l)} \right) \left( 1 - \frac{\partial w_{i,q}^{(l)}}{\partial w_i^{(l)}} \right) = \begin{cases} \pm\infty, & \text{if } w_i^{(l)} = \left( k + \frac{1}{2} \right) \Delta^{(l)} \\ \frac{\lambda}{M^{(l)}} \left( w_i^{(l)} - w_{i,q}^{(l)} \right) & \text{otherwise} \end{cases}.$$

This means that the weights $$w_i^{(l)}$$

are optimized more strongly the larger the respective quantization error is. $\Delta^{(l)}$ is the respective step width of the quantization for the step l. The first case in the distinguishing of cases can be disregarded for practical purposes, because the weights $$w_i^{(l)}$$

at the beginning of the training of an ANN are usually initialized with random floating-point values. The probability that such a value will fall exactly on a quantization stage tends to zero.

The present invention also relates to a method for producing a trainable module that maps one or more input variables, through an internal processing chain, onto one or more output variables. Here, the internal processing chain is characterized by a set of parameters.

In accordance with an example embodiment of the present invention, in the method, first the described method is used to ascertain discrete values for the parameters of the internal processing chain of the trainable module, and, optionally, the trainable module is subsequently validated. After this, the internal processing chain of the trainable module is implemented in an arithmetic unit that is designed to represent and/or process the parameters that characterize the internal processing chain, in fixed-point arithmetic. Here, the implementation can in particular include the provision of corresponding hardware. In the arithmetic unit, the parameters are set to the previously ascertained discrete values.

As described above, in this method fast floating-point hardware can be used for the actual development and possible validation of the trainable module. Subsequently, the trainable module can be implemented on fixed-point hardware without its behavior further changing. When inferences are carried out during the operation of the trainable module, due to the fixed-point arithmetic there results a significant runtime advantage compared to an implementation in hardware with comparable costs and/or comparable energy consumption.

Correspondingly, the present invention also relates to a further method. In accordance with an example embodiment of the present invention, in the method, a trainable module is first trained with the above-described method for training. The trainable module is subsequently operated by supplying one or more input variables to it. As a function of the output variables supplied by the trainable module, a vehicle, a robot, a quality control system, and/or a system for monitoring an area on the basis of sensor data are controlled.

The application of this method can in particular leave, on the completed trainable module, a "fingerprint" indicating that this module has fixed-point hardware for the representation and/or processing of the parameters. The present invention therefore also relates to a trainable module for the mapping of one or more input variables onto one or more output variables using an internal processing chain that is characterized by a set of parameters and is implemented in an arithmetic unit. The arithmetic unit is designed to represent and/or process the parameters in fixed-point arithmetic.

As explained above, such trainable modules can be installed in particular in control devices for vehicles and other embedded systems. Especially in such devices, despite the requirement of reliable functioning of the trainable module there exists a high cost pressure relating to the hardware that is to be used. Standard GPUs used for the development of, for example, ANNs can cost several thousand euros and require an electrical power level that is difficult to provide in the on-board electrical network of, for example, a passenger vehicle. Fixed-point hardware is significantly lower in cost, and at the same time is significantly more energy-efficient and space-saving. Therefore, the present invention also relates to a control device for a vehicle and/or an embedded system having the trainable module described above, and/or having some other trainable module trained and/or produced using one of the methods described above.

The trainable module can be designed in particular as a classifier and/or regressor for physical measurement data recorded by at least one sensor. It then enables a predictively powerful evaluation, generalizable to many situations, of the physical measurement data using artificial intelligence, even in applications in which only limited hardware, limited energy, or limited installation space is available. The sensor can for example be an imaging sensor, a radar sensor, a lidar sensor, or an ultrasonic sensor.

The described method(s) in accordance with the present invention can be completely or partially computer-implemented. It can for example be part of a computer-implemented development environment for trainable modules. The implementation of the internal processing chain of the trainable module during its production can also be computer-implemented, for example during automated manufacturing. Therefore, the present invention also relates to a computer program having machine-readable instructions that, when they are executed on one or more computers, cause the computer or computers to carry out one of the described methods. The present invention also relates to a machine-readable data carrier and/or a download product having the computer program.

The present invention also relates to a computer or some other computing unit having the described computer program and/or having the described machine-readable data carrier and/or download product. The computer, or the computing unit, can also be specifically designed in some other way to carry out one of the described methods. Such a specific design can for example be realized in one or more field-programmable gate arrays (FPGA) and/or in one or more application-specific integrated circuits (ASIC).

Further measures that improve the present invention are presented in the following together with the description of the preferred exemplary embodiments of the present invention, on the basis of Figures.

limitation of the value range of parameters 12*a* at each update step, in accordance with the present invention.

DETAILED DESCRIPTION OF EXAMPLE EMBODIMENTS

Figure 1:
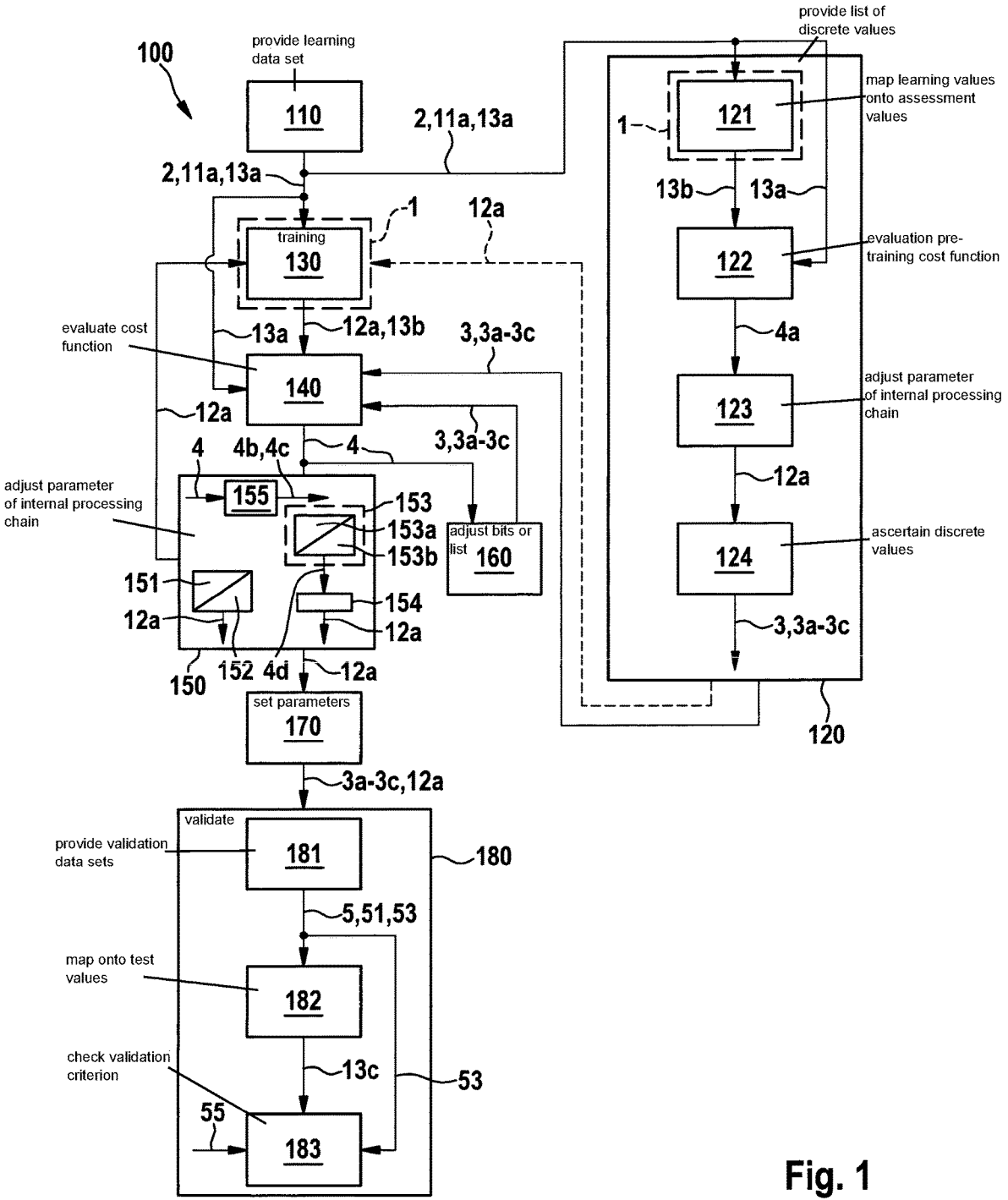
FIG. 1 shows an exemplary embodiment of method 100 for training a trainable module 1, in accordance with the present invention.

FIG. 1 is a flow diagram of an exemplary embodiment of method 100 for training a trainable module 1. In step 110, at least one learning data set 2 is provided that includes learning values 11*a* of trainable module 1, as well as learning values 13*a* of output variables 13 of trainable module 1. In addition, in step 120 a list 3 of discrete values 3*a*-3*c* is provided from which parameters 12*a*, which characterize the internal processing chain 12 of trainable module 2, are to be selected. These discrete values 3*a*-3*c* are selected such that they can be stored with a specified number N of bits without loss of quality as a fixed-point number.

List 3 of discrete values 3*a*-3*c* can for example be ascertained using a pre-training of trainable module 1. This pre-training can also be used in learning data sets 2 provided in step 110.

In the example, shown in box 120 in FIG. 1, of the pre-training, according to block 121 learning values 11*a* of input variables 11 are mapped by trainable module 1 onto assessment values 13*b* of the output variables. According to block 122, a pre-training cost function 4*a* is evaluated that characterizes a deviation of assessment values 13*b* of the output variables from the learning values 13*a*, contained in learning data set 2, of output variables 13. According to block 123, at least one parameter 12*a* of internal processing chain 12 of trainable module 1 is adjusted as a function of the value ascertained in this way of pre-training cost function 4*a*.

Finally, according to block 124, list 3 of discrete values 3*a*-3*c* can be ascertained from the thus obtained values of parameters 12*a*. For example, an interval can be ascertained in which parameters 12*a* lie, and discrete values 3*a*-3*c* can be distributed over this interval, for example in equidistant fashion.

In step 130, the actual training of trainable module 1 begins. Here, learning values 11*a* are in turn mapped by trainable module 1 onto assessment values 13*b* of the output variables. However, cost function 4, subsequently evaluated in step 140, depends—differing from pre-training cost function 4*a* in the optional pre-training—not only on the deviation of assessment values 13*b* from the learning values 13*a*, but in addition also characterizes a deviation of at least one parameter 12*a* of internal processing chain 12 from at least one discrete value 3*a*-3*c* in list 3. In step 150, at least one parameter 12*a* of internal processing chain 12 is adjusted as a function of the value of cost function 4 ascertained in this way.

Standardly, many learning data sets 2 are used, and these learning data sets 2 are also processed repeatedly, in a multiplicity of epochs, by trainable module 1. Each time that modified values are ascertained for parameters 12*a* of internal processing chain 12, these can be played back onto trainable module 1, and can thus immediately influence the thereupon following processings of learning data sets 2. The training can for example end when a specified termination condition is reached. The termination condition can for example include a threshold value for the cost function, and/or a time available for the training, and/or the completion of a specified number of epochs.

The training in step 130 can for example be initialized with random values for parameters 12*a*. If, however, a pre-training has already been carried out in order to define list 3 of discrete values 3*a* 3*c*, then the parameters 12*a* ascertained in this pre-training can be used as start values. In this way, the outlay invested in this pre-training is optimally made use of.

Alternatively to, or also in combination with, the pre-training, in step 160 the number N of bits and/or the list 3 of discrete values 3*a*-3*c* can be adjusted as a function of the value of cost function 4.

In step 170, parameters 12*a* can be set to those discrete values 3*a*-3*c* from list 3 that respectively lie closest to them. Optionally, trainable module 1 can subsequently be validated in step 180. When trainable module 1 is finally implemented on hardware, it will show exactly the same behavior as in validation 180.

During the validation, according to block 181 a multiplicity of validation data sets 5 are provided. These validation data sets 5 each include validation values 51 of input variables 11 and associated validation values 53 of output variables 13. Here, the set of validation data sets 5 is not identical with the set of learning data sets 2. Particularly advantageously, these two sets are disjoint.

According to block 182, for each validation data set 5 the respective validation values 51 of input variables 11 are mapped by trainable module 1 onto test values 13*c* of output variables 13. According to block 183, it is checked whether the deviations of test values 13*c* from the validation values 53 fulfill a specified criterion 55. If this is the case, then trained trainable module 1 is found to be suitable for real-world use.

Inside box 150, as an example a plurality of possibilities are indicated as to how adjustment 150 of parameters 12*a* during the training can be refined in order to improve accuracy and at the same time to save training time.

According to block 151, values of parameters 12*a* that are lower than the lowest discrete value 3*a*-3*c* of list 3 are set to this lowest discrete value 3*a*-3*c*. According to block 152, values of parameters 12*a* that are higher than the highest discrete value 3*a*-3*c* of list 3 are set to this highest value 3*a*-3*c*.

The adjustment 150 of parameters 12*a* can include, according to block 153, the ascertaining of a gradient 4*d* of cost function 4, expressed in parameters 12*a* as variables, the gradient being in the direction towards better values of cost function 4, and, according to block 154, modifying parameters 12*a* by a product of gradient 4*d* and a step width. According to block 153*a*, components of gradient 4*d* that relate to parameters 12*a* that currently have the lowest discrete value 3*a*-3*c* of list 3 can then be limited to non-negative values. According to block 153*b*, components of gradient 4*d* that relate to parameters 12*a* that currently have the highest discrete value 3*a*-3*c* of list 3 can be limited to non-positive values.

Cost function 4 can contain a weighted sum of at least two contributions. In the example shown in FIG. 1, there are two contributions 4*b* and 4*c*. Here, first contribution 4*b* characterizes a deviation of assessment values 13*b* of output variables 13 from learning values 13*a*, contained in learning data set 2, of output variables 13. Second contribution 4*c* characterizes a deviation of at least one parameter 12*a* of internal processing chain 12 from at least one discrete value 3*a*-3*c* in list 3. According to block 155, as the training progresses the weighting of first contribution 4*b* can then be reduced and the weighting of second contribution 4*c* increased.

Figure 2:
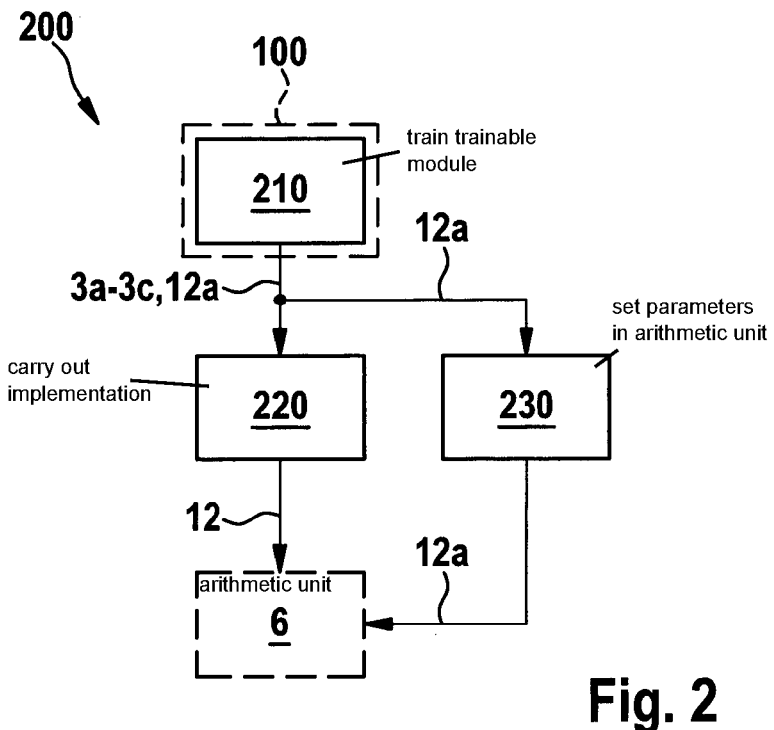
FIG. 2 shows an exemplary embodiment of method 200 for producing a trainable module 1, in accordance with the present invention.

FIG. 2 is a flow diagram of an exemplary embodiment of method 200 for producing a trainable module 1. In step 210, the trainable module is trained using method 100, and whole-number values are ascertained for parameters 12*a* of internal processing chain 12 of trainable module 1. Here, numerically adjacent discrete values 3*a*-3*c* each differ by a step width Δ that is a power of two of a non-negative whole number.

As described above, the representation and/or processing of these parameters can be implemented particularly well in fixed-point arithmetic. In step 220, such an implementation is carried out on an arithmetic unit 6 that is designed to represent and/or process parameters 12*a* in fixed-point arithmetic. In step 230, parameters 12*a* are set, in the arithmetic unit, to the whole-number values ascertained in step 210.

Figure 3:
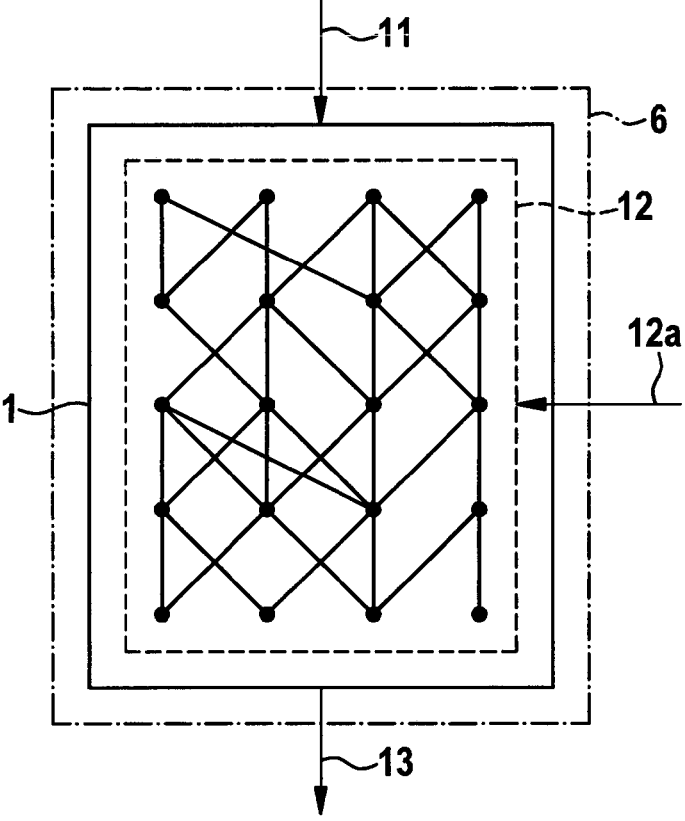
FIG. 3 shows an exemplary embodiment of trainable module 1, in accordance with the present invention.

FIG. 3 shows an exemplary embodiment of trainable module 1. Trainable module 1 is implemented in an arithmetic unit 6 that is designed to represent and/or process parameters 12*a* in fixed-point arithmetic. Using internal processing chain 12, shown as an example as artificial neural network ANN and characterized by parameters 12*a*, during operation of trainable module 1 one or more input variables 11 are mapped onto one or more output variables 13.

Figure 4:
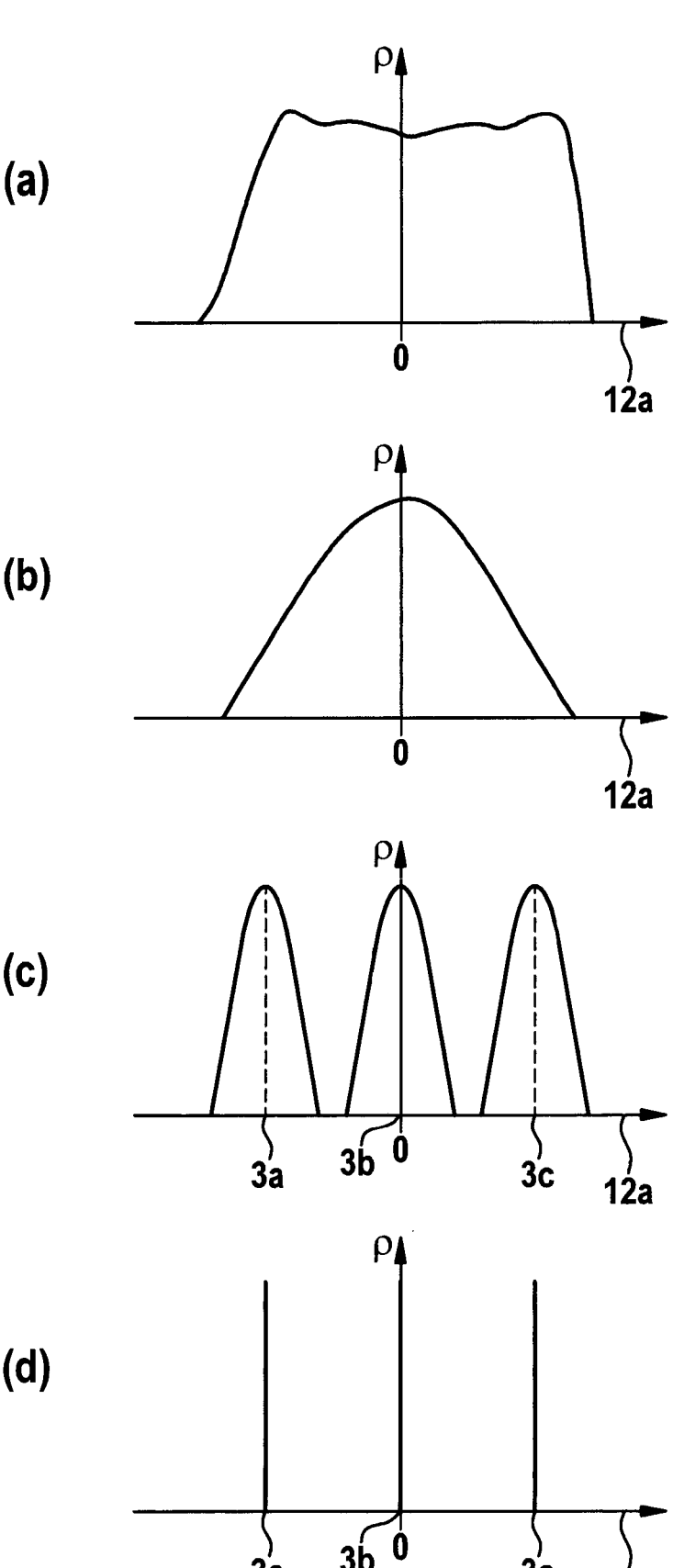
FIG. 4 shows an example of the qualitative effect of method 100 on parameters 12a of internal processing chain 12 of trainable module 1, in accordance with the present invention.

FIG. 4 qualitatively shows the effect of method 100 on the structure shown by the spectrum of parameters 12*a*. In the diagrams, in each case the frequency ρ of the values of parameters 12*a* is plotted over these values.

Diagram (a) shows a uniform distribution such as that which occurs for example during an initialization of parameters 12*a* with random values. Diagram (b) shows a normal distribution that occurs during a conventional training without limitation to discrete values 3*a*-3*c* from a list 3. Diagram (c) shows a multimodal distribution that occurs during training using method 100 for three discrete values 3*a*-3*c*, shown as examples. The optimal theoretical distribution for these three quantization stages 3*a* 3*c* would be the Dirac distribution, having three Dirac pulses, shown in diagram (d).

Figure 5:
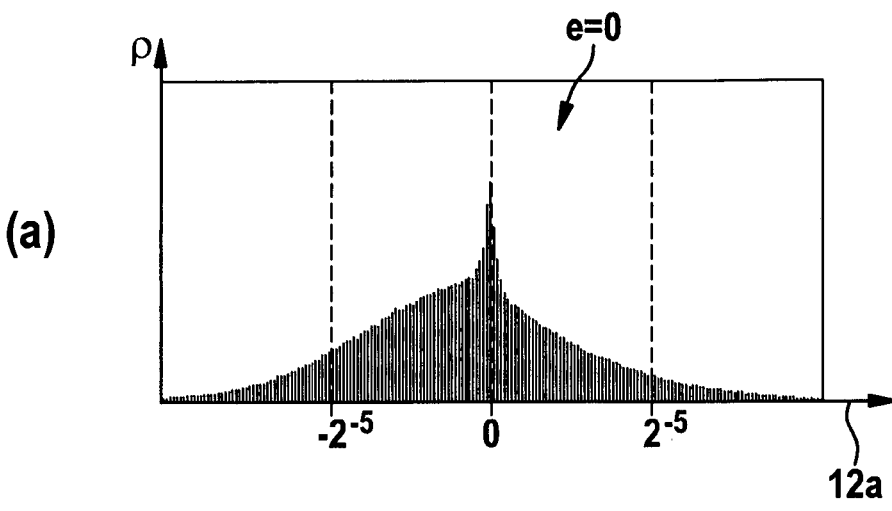
FIG. 5 shows an example of the development of parameters 12a in the course of method 100, in accordance with the present invention.
Figure 5:
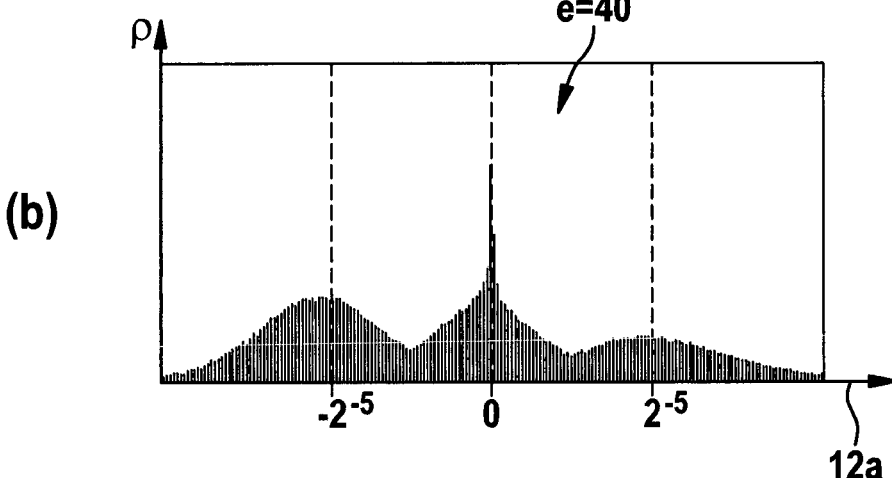
Figure 5:
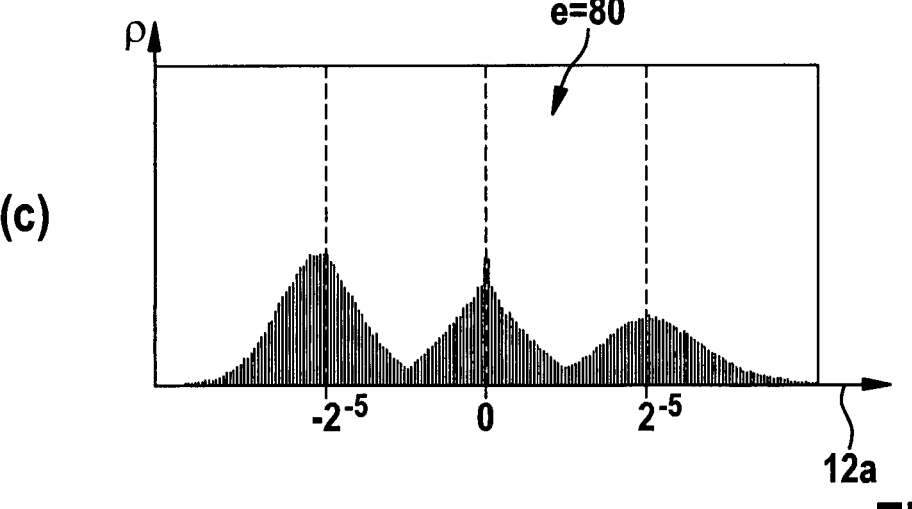
Figure 5:
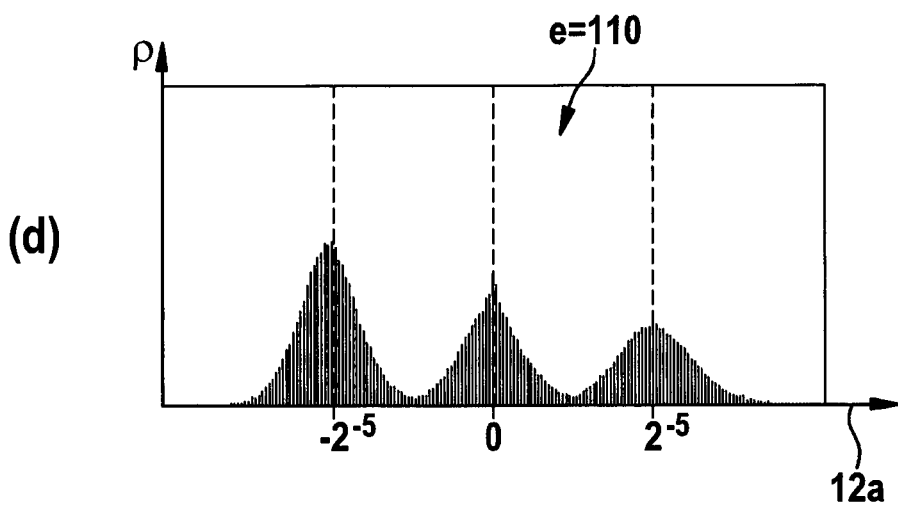
Figure 5:
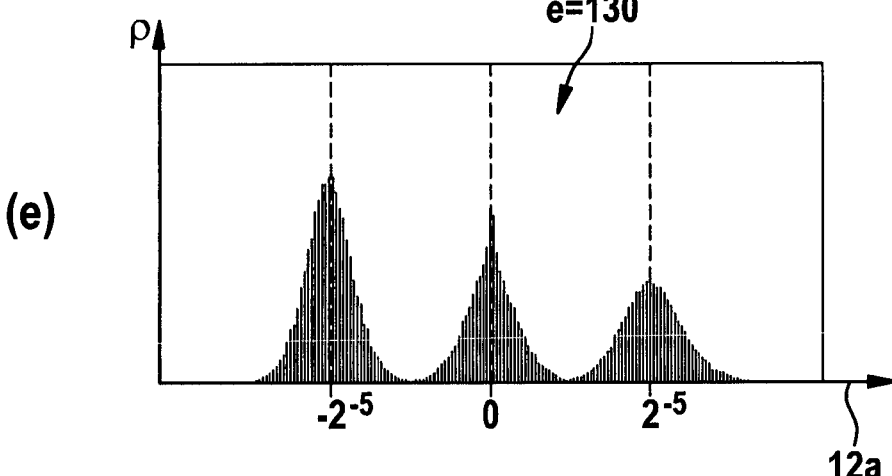
Figure 5:
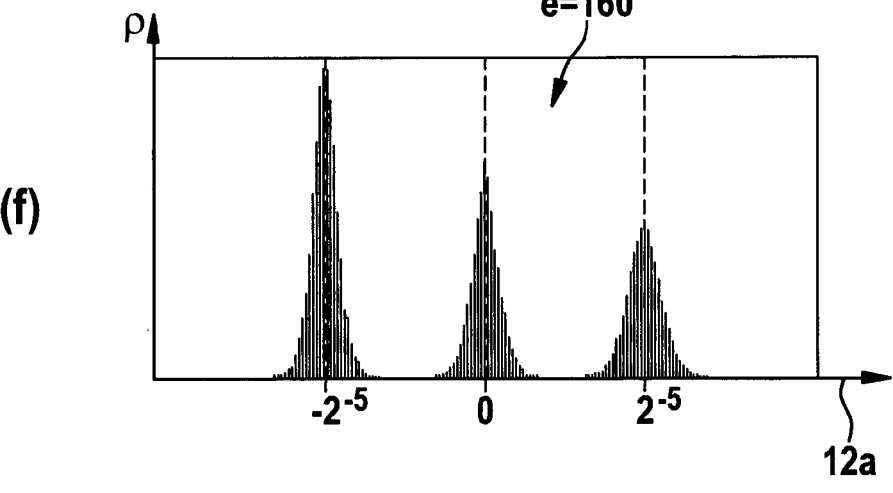
Figure 6:
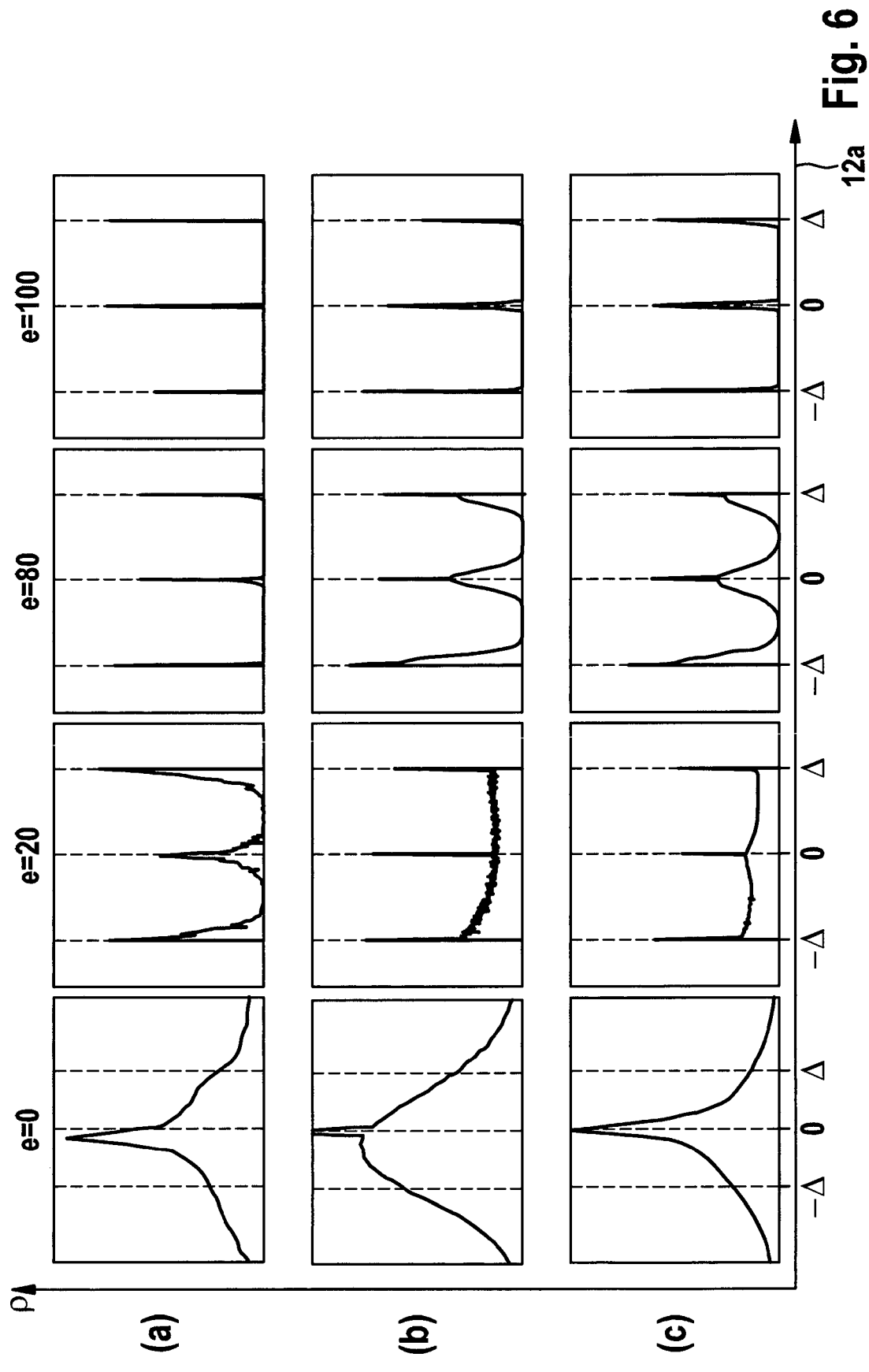
FIG. 6 shows a further example of the development of parameters 12a with limitation of the value range of parameters 12a at each update step, in accordance with the present invention.

FIG. 5 shows, for the example of the real training of a trainable module 1 having a ANN as internal processing chain 12 on benchmark data set "CIFAR-10," how the frequencies ρ of values of parameters 12*a* of a specific layer in the ANN develop as a function of the epoch number e. At the beginning of the training (e=0), parameters 12*a* are approximately normally distributed, as in the sketch in diagram (b) in FIG. 4. As epoch number e increases, the distribution more and more closely approaches the multimodal distribution shown in diagram (c) of FIG. 4. FIG. 6 shows, in a further example, how parameters 12*a* of (seen from above) the first layer (series (a)), the fourth layer (series (b)), and the seventh layer (series (c)) of a VGG11-ANN develop in the course of the training on the benchmark data set "CIFAR-100" as a function of the epoch number e. The four columns of FIG. 6 correspond, from left to right, to the epoch numbers e=0, e=20, e=80, and e=100. Analogous to FIG. 5, in each of the diagrams in FIG. 6 the frequencies ρ of values of parameters 12*a* of the respective layer for the respective epoch number e are plotted. In the example shown in FIG. 6, for the parameters 12*a* in each case only the three discrete values −Δ, 0, and Δ are permitted.

At the beginning of the training (e=0), the distribution of parameters 12*a*, originating from a pre-training, is unimodal, with a peak at 0. The distribution also includes excursions for values of parameters 12*a* that are below −Δ or above Δ. In the example shown in FIG. 6, at each update step of parameters 12*a* the values of these parameters 12*a* are limited to the interval [−Δ, Δ]. Therefore, already at e=20 the named excursion values have completely disappeared.

As the training progress increases, i.e. with increasing epoch number e, in cost function 4 the weight of a first contribution 4*b*, which relates to the training of the ANN in relation to the classification task on the CIFAR-100 data set, is reduced. In contrast, the weight of a second contribution 4*c*, which relates to the regularization through discretization of parameters 12*a*, is increased.

At epoch number e=100, the centers of the three peaks of the distributions lie so close to the discrete values −Δ, 0, and Δ that the discretization of parameters 12*a* no longer results in any significant error.

Figure 7:
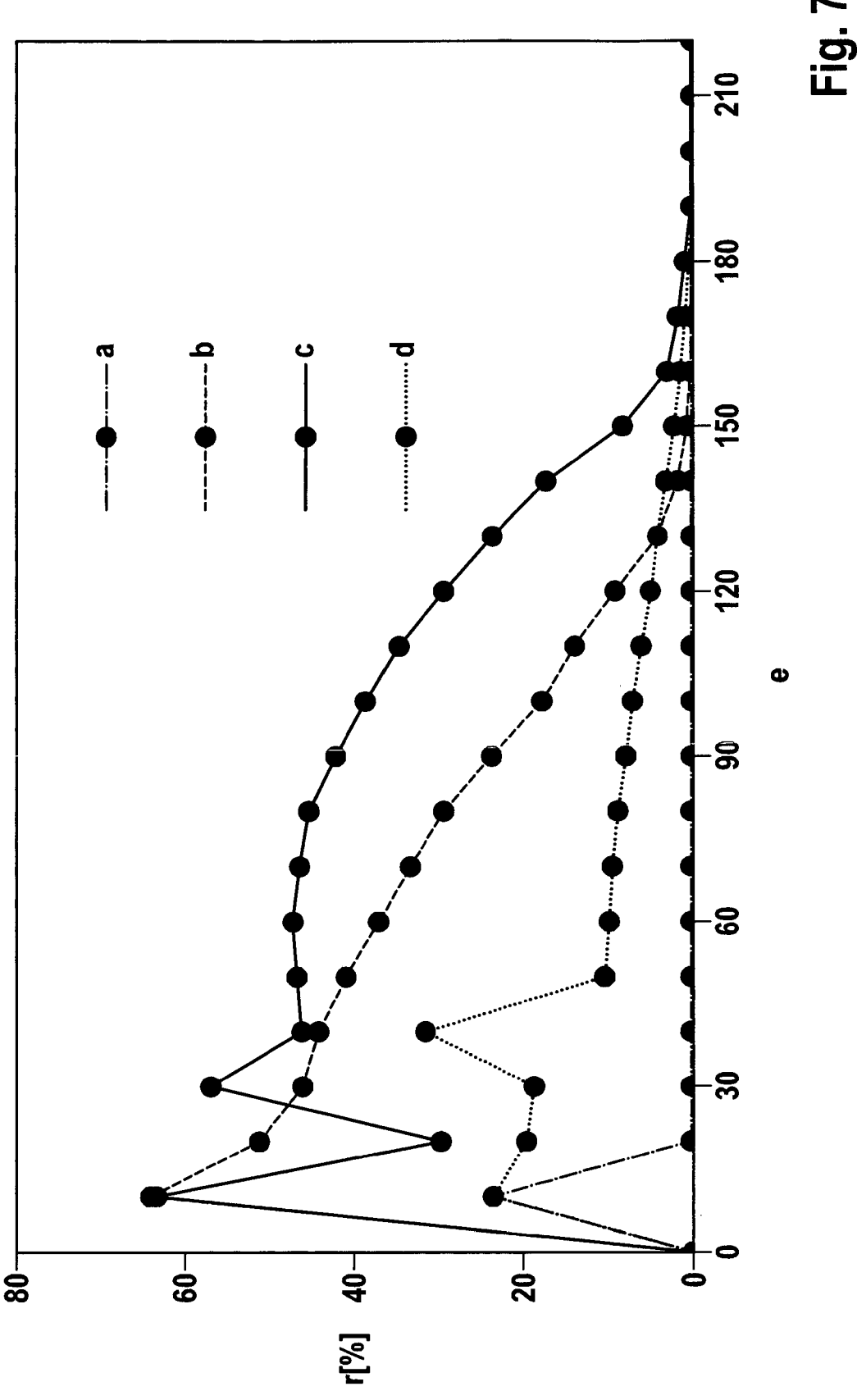
FIG. 7 shows an example of the curve of the convergence of parameters 12a in various layers a-d of an artificial neural network, in accordance with the present invention.

FIG. 7 shows, on the basis of the real training already illustrated in FIG. 5, what percentage r of parameters 12*a* in various layers a-d of the ANN, in a training time period that extends back epochs from the respectively indicated epoch 10, is "rotated"; i.e., in what percentage a change takes place from one mode of the multimodal distribution to another. Layers a-c are convolutional layers, and, in the layer sequence of the ANN, are situated at the first, third, and fifth position. Layer d is a fully networked layer, and in the layer sequence of the ANN is at the seventh position. It can be seen that parameters 12*a* in the various layers finally "decide" for one of the modes with different speeds. Starting from an epoch number e of approximately 180, this decision is however cemented everywhere in the ANN.

Figure 8:
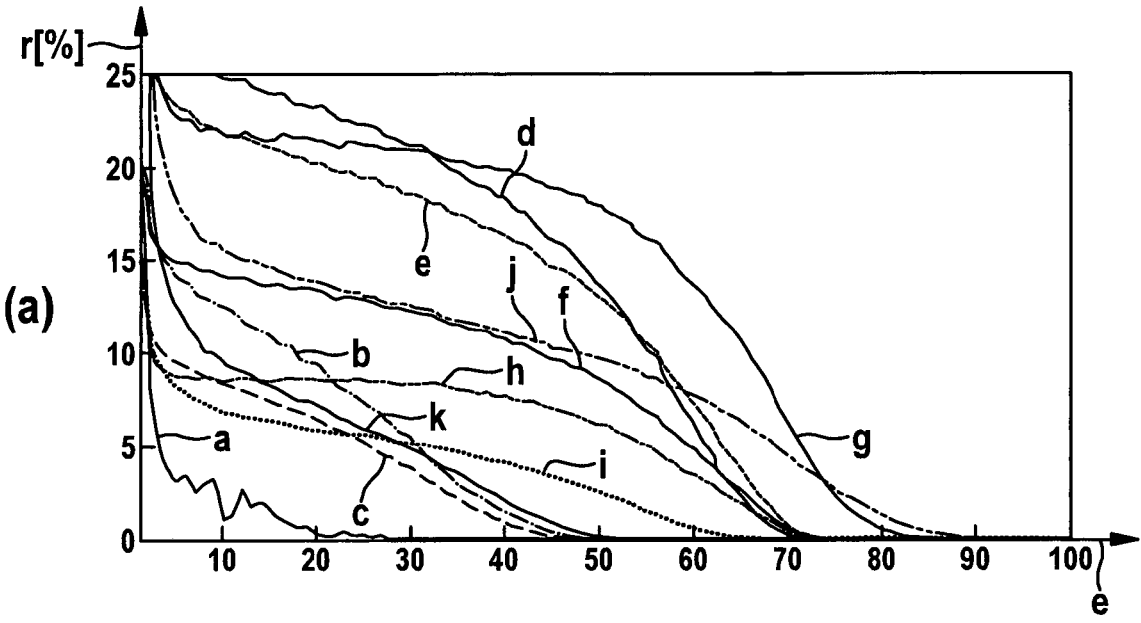
FIG. 8 shows a further example of the convergence of parameters 12a with (diagram (a)) and without (diagram (b))
Figure 8:
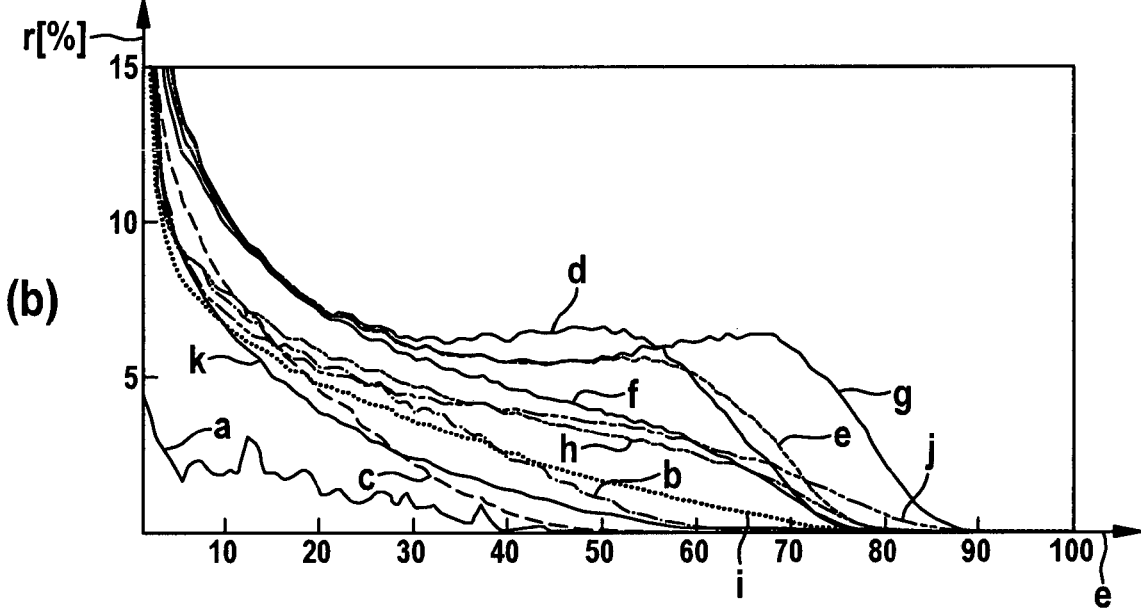

FIG. 8 shows, on the basis of the real training already illustrated in FIG. 6, what percentage r of parameters 12*a* of layers a-k of the ANN in each epoch e have changed from one mode of the multimodal distribution to another. Diagram (a) shows the curve of r with limitation of the value range of parameters 12*a* to the interval [−Δ, Δ] after each update step. Diagram (b) shows, for comparison, the curve of r without this limitation of the value range.

The limitation of the value range has the effect, clearly visible in the comparison, that in particular at the beginning of the training a particularly large number of parameters 12*a* change their mode, i.e. change from one of the discrete values 3*a*-3*c* of the list 3 to another. This means that in particular at the beginning of the training there is greater learning progress than without the limitation of the value range. As explained above, this improves the accuracy of the training and at the same time significantly saves training time.

What is claimed is:

1. A method for training a trainable module that maps one or more input variables onto one or more output variables through an internal processing chain, the internal processing chain being characterized by a set of parameters, the method comprising the following steps:

training the trainable module, the training including:

providing at least one learning data set that includes learning values of the input variables and associated learning values of the output variables;

providing a list of discrete values from which the parameters characterizing the internal processing chain are to be selected during the training, the discrete values being selected such that the discrete values can be stored with a specified number N of bits as a fixed-point number without loss of quality;

mapping, by the trainable module, the learning values contained in the learning data set of the input variables onto assessment values of the output variables;

evaluating a specified cost function that characterizes both a deviation of the assessment values of the output variables from the learning values, contained in the learning data set, of the output variables, and also a deviation of at least one of the parameters of the internal processing chain from at least one of the discrete values in the list; and adjusting at least one of the parameters of the internal processing chain with a goal of improving a value of the cost function, wherein a value range of the parameters, and/or of a gradient of the cost function, is limited during the adjustment of the at least one of the parameters, using the discrete values.

2. The method as recited in claim 1, wherein, during the at least one adjustment of at least one of the parameters:

values of the parameters that are lower than a lowest discrete value of the list are set to the lowest discrete value, and/or values of the parameters that are higher than a highest discrete value of the list are set to the highest discrete value.

3. The method as recited in claim 1, wherein in at least one adjustment of the parameters, a gradient of the cost function expressed in the parameters as variables is ascertained, the gradient being in a direction towards better values of the cost function, and the parameters being modified by a product of the gradient and a step width, in which, in the ascertaining of the gradient:

components of the gradient that relate to those of the parameters that currently have a lowest discrete value of the list are limited to non-negative values, and/or components of the gradient that relate to those of the parameters that currently have a highest discrete value of the list are limited to non-positive values.

4. The method as recited in claim 1, wherein the cost function contains a weighted sum of at least:

a first contribution that characterizes a deviation of the assessment values of the output variables from the learning values, contained in the learning data set, of the output variables, and a second contribution that characterizes a deviation of at least one parameter of the internal processing chain from at least one discrete value in the list, wherein, as the training progresses, a weighting of the first contribution is reduced and a weighting of the second contribution is increased.

5. The method as recited in claim 1, wherein the number N of bits is between 2 and 7.

6. The method as recited in claim 1, wherein the number N of bits is between 2 and 5.

7. The method as recited in claim 1, wherein the number N of bits is between 2 and 3.

8. The method as recited in claim 1, wherein the list of discrete values is ascertained based on values of the parameters of the internal processing chain that are obtained during a pre-training of the trainable module, the pre-training including the following steps:

mapping, by the trainable module, learning values contained in at least one learning data set, of the input variables onto assessment values of the output variables;

evaluating a specified pre-training cost function that characterizes a deviation of the assessment values of the output variables from the learning values, contained in the learning data set, of the output variables; and adjusting at least one parameter of the internal processing chain with a goal of improving a value of the pre-training cost function.

9. The method as recited in claim 8, wherein a value range is ascertained in which the parameters lie, and discrete values of the list are ascertained as a function of the ascertain value range.

10. The method as recited in claim 1, wherein the number N of bits and/or the list of discrete values is adjusted with a goal of improving the value of the cost function.

11. The method as recited in claim 1, wherein the discrete values in the list have whole-number values, and discrete values that are numerically adjacent to one another differing in each case by a step width that is a power of two of a non-negative whole number.

12. The method as recited in claim 1, wherein the discrete values in the list are distributed uniformly around 0.

13. The method as recited in claim 1, wherein each of the parameters is set to that discrete value from the list to which it is closest, and the trainable module is validated after the setting of the parameters to the discrete values, the validating including the following steps:

providing a multiplicity of validation data sets that each include respective validation values of the input variables and associated validation values of the output variables, the validation data sets not being identical with the learning data sets;

for each of the validation data sets, mapping, by the trainable module, the respective validation values of the input variables onto test values of the output variables; and checking whether deviations of the test values from the validation values of the output variables fulfill a specified criterion.

14. The method as recited in claim 1, wherein the list of discrete values includes at least three discrete values.

15. The method as recited in claim 1, further comprising outputting the trainable module.

16. The method as recited in claim 15, wherein each of the parameters is set to that discrete value from the list to which it is closest, and the output trainable module is validated after the setting of the parameters to the discrete values.

17. A method, comprising:

training a trainable module that maps one or more input variables onto one or more output variables through an internal processing chain, the internal processing chain being characterized by a set of parameters, the training including:

providing at least one learning data set that includes learning values of the input variables and associated learning values of the output variables, providing a list of discrete values from which the parameters characterizing the internal processing chain are to be selected during the training, the discrete values being selected such that the discrete values can be stored with a specified number N of bits as a fixed-point number without loss of quality, mapping, by the trainable module, the learning values contained in the learning data set of the input variables onto assessment values of the output variables, evaluating a specified cost function that characterizes both a deviation of the assessment values of the output variables from the learning values, contained in the learning data set, of the output variables, and also a deviation of at least one of the parameters of the internal processing chain from at least one of the discrete values in the list, and adjusting at least one of the parameters of the internal processing chain with a goal of improving a value of the cost function, wherein a value range of the parameters, and/or of a gradient of the cost function, is limited during the adjustment of the at least one of the parameters, using the discrete values;

operating the trainable module by supplying one or more input variables to the trainable module; and as a function of the output variables supplied by the trainable module, controlling a vehicle or a robot or a quality control system or a system for monitoring an area, based on sensor data.

18. A non-transitory machine-readable data carrier on which is stored a computer program for training a trainable module that maps one or more input variables onto one or more output variables through an internal processing chain, the internal processing chain being characterized by a set of parameters, the computer program, when executed by one or more computers, causing the one or more computers to perform the following steps:

training the trainable module, the training including:

providing at least one learning data set that includes learning values of the input variables and associated learning values of the output variables;

providing a list of discrete values from which the parameters characterizing the internal processing chain are to be selected during the training, the discrete values being selected such that the discrete values can be stored with a specified number N of bits as a fixed-point number without loss of quality;

mapping, by the trainable module, the learning values contained in the learning data set of the input variables onto assessment values of the output variables;

evaluating a specified cost function that characterizes both a deviation of the assessment values of the output variables from the learning values, contained in the learning data set, of the output variables, and also a deviation of at least one of the parameters of the internal processing chain from at least one of the discrete values in the list; and adjusting at least one of the parameters of the internal processing chain with a goal of improving a value of the cost function, wherein a value range of the parameters, and/or of a gradient of the cost function, is limited during the adjustment of the at least one of the parameters, using the discrete values.

19. A computer configured to train a trainable module that maps one or more input variables onto one or more output variables through an internal processing chain, the internal processing chain being characterized by a set of parameters, the computer configured to:

train the trainable module, the training including:

provide at least one learning data set that includes learning values of the input variables and associated learning values of the output variables;

provide a list of discrete values from which the parameters characterizing the internal processing chain are to be selected during the training, the discrete values being selected such that the discrete values can be stored with a specified number N of bits as a fixed-point number without loss of quality;

map, by the trainable module, the learning values contained in the learning data set of the input variables onto assessment values of the output variables;

evaluate a specified cost function that characterizes both a deviation of the assessment values of the output variables from the learning values, contained in the learning data set, of the output variables, and also a deviation of at least one of the parameters of the internal processing chain from at least one of the discrete values in the list; and adjust at least one of the parameters of the internal processing chain with a goal of improving a value of the cost function, wherein a value range of the parameters, and/or of a gradient of the cost function, is limited during the adjustment of the at least one of the parameters, using the discrete values.

* * * * *